UNITED STATES PATENT OFFICE.

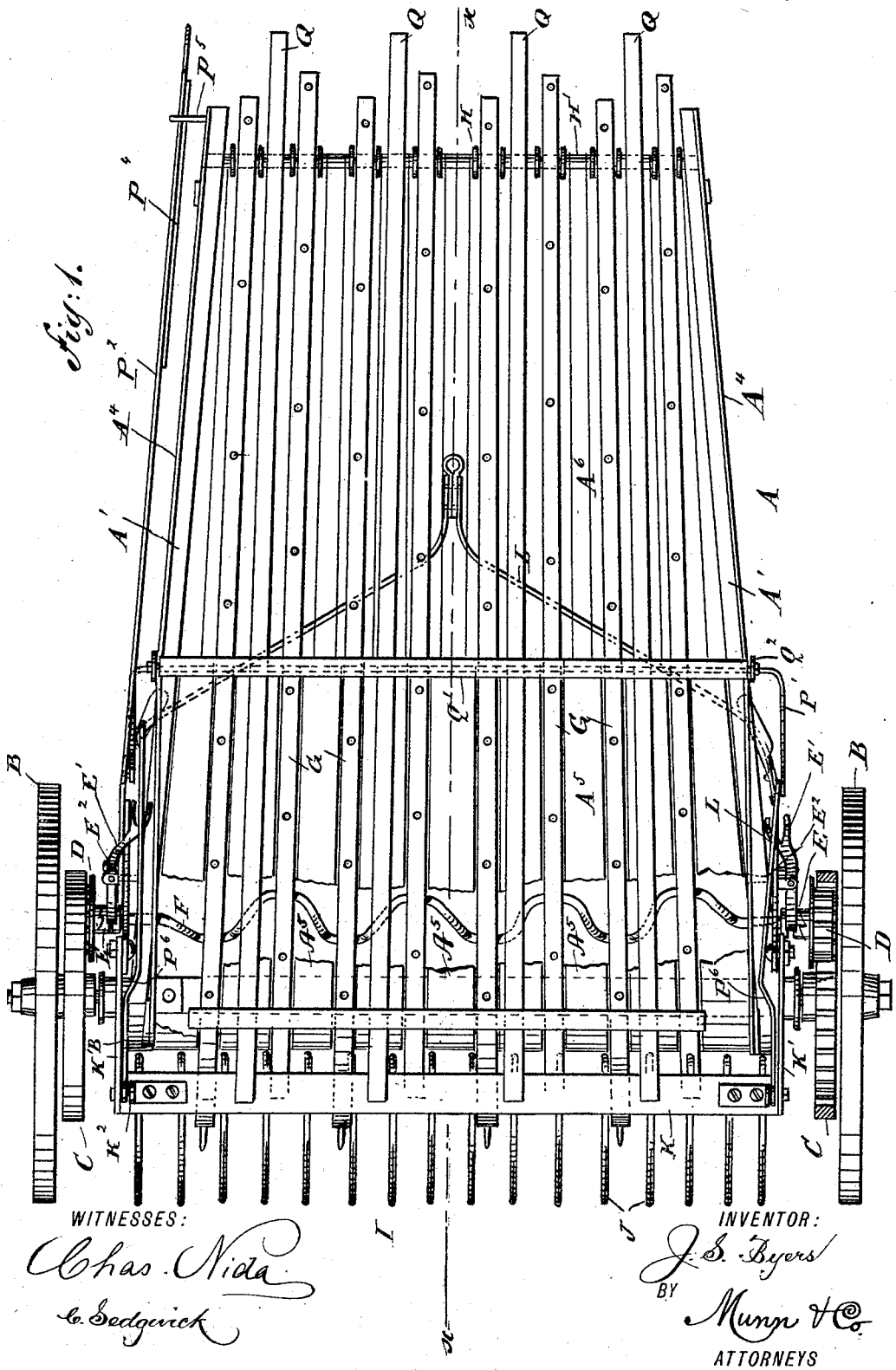

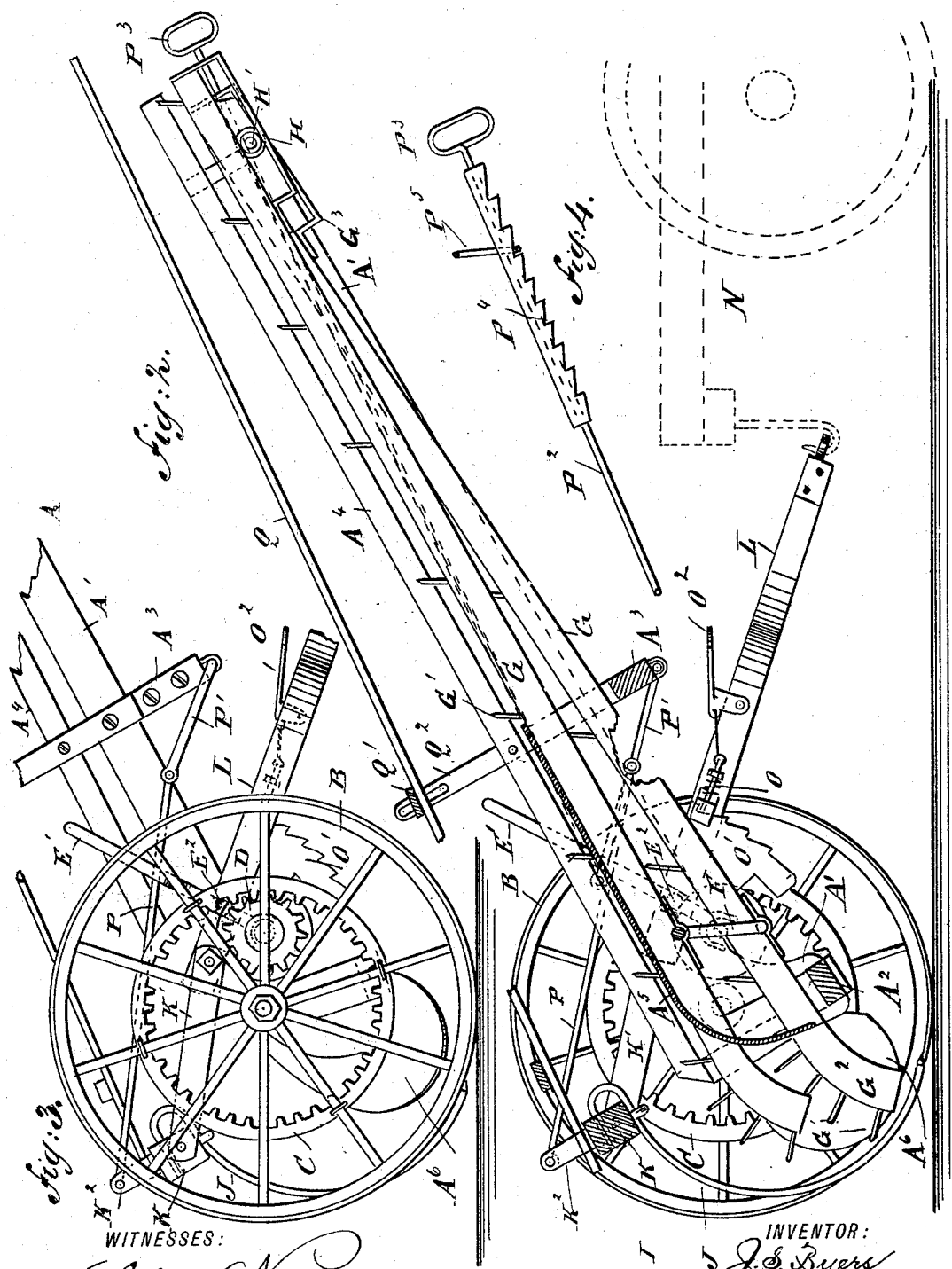

JESSE S. BYERS, OF KNOXVILLE, ILLINOIS.

RAKE AND LOADER.

SPECIFICATION forming part of Letters Patent No. 509,852, dated November 28, 1893.

Application filed September 24, 1890. Renewed January 18, 1893. Serial No. 458,834. (No model.)

*To all whom it may concern:*

Be it known that I, JESSE S. BYERS, of Knoxville, in the county of Knox and State of Illinois, have invented a new and Improved Rake and Loader, of which the following is a full, clear, and exact description.

The object of the invention is to provide a new and improved hay rake and loader, which is simple and durable in construction, readily gathers the hay when moved over the field, and elevates it and discharges it into a wagon which pulls the machine.

The invention consists of certain parts and details and combinations of the same, as will be fully described hereinafter and then pointed out in the claims.

Reference is to be had to the accompanying drawings forming a part of this specification, in which smilar letters of reference indicate corresponding parts in all the figures.

Figure 1 is a plan view of the improvement. Fig. 2 is a sectional side elevation of the same, on the line $x$—$x$ in Fig. 1. Fig. 3 is a partial side elevation of the same; and Fig. 4 is a side elevation of the arm for operating the rake fingers.

The improved rake and loader is provided with a suitably-constructed elevator frame A, having at its lower end two short stationary axles or studs on which turn two drive wheels B, adapted to travel on the ground, and each carrying on its inside an internal gear wheel C, in mesh with a pinion D, adapted to be connected by a clutch mechanism E, with a crank shaft F, extending transversely and mounted to turn in suitable bearings on the main frame A, the crank arms of the said crank shaft engaging the elevator arms G, carrying at their upper edges or faces teeth G', for elevating the hay. The pinions D are mounted to turn loosely on the outer ends of the crank shaft F, and the clutches E are of the usual construction and fitted to slide on and to turn with the crank shaft, and operated by shifting levers E', fulcrumed at $E^2$ to the side rails or beams A', of the main frame A. The side beams A' of the main frame are connected with each other at their lower ends by a cross bar $A^2$, and are also connected at or near their middles by a transverse beam $A^3$, which also forms a guide for the elevator arms G. In order to prevent the material from dropping off the sides of the elevator arms or the main frame A, the latter is provided with guard rails $A^4$, held on top of the side rails A'. Between the several elevator arms G are arranged the plates $A^5$ for preventing the material from dropping downward between the several elevator arms G. The lower ends of the elevator arms G are curved downward, as is plainly shown at $G^2$, the teeth G' thereon being close together and arranged about radially, as is plainly shown in Fig. 2. The upper ends of the elevator arms are provided on their under side with longitudinally-extending guides $G^3$, adapted to engage rollers H, mounted to turn loosely on the shaft H', held at the upper end of the side beams A' of the main frame A. Each of the rollers is provided with a flange at its outer end so as to prevent displacement of the respective elevator arm.

At the lower ends of the elevator arms G is arranged a rake I, provided with the curved rake fingers J, between which are adapted to swing the lower ends $G^2$, of the elevator arms G, so that the hay or other material gathered by said raking fingers, is lifted upward by the teeth G' of the elevator arms, and as the latter move alternately up and down, the material is shifted upward from one to the other, so as to be elevated until its drops off at the upper ends of the elevator arms. The rake fingers J are secured at their upper ends in a transversely-extending beam K, pivoted on arms K', pivotally connected with the arms of the U-shaped tongue L, fulcrumed on the side beams A' of the main frame, preferably at the pivot $E^2$, which also forms the fulcrum for the shifting levers E', as previously mentioned. The tongue L extends to the front of the machine, underneath the elevator arms G, and is adapted to hook upon the rear end of the wagon N, on which the hay is to be loaded and which is pulled over the field, thus dragging the rake and loader along. The tongue L is provided with spring catches O, adapted to engage the segmental rack O', secured on the side beams A' of the main frame A. The teeth of the segmental rack O' are so arranged that the upper end of the main frame A can be swung upward by the operator standing on the wagon N, the operator simply lifting the upper end of the main frame A, and the tongue L remains in its position by being connected with the wagon N and the catches O sliding over the teeth of the rack O'. In order to swing the elevator downward the catches O have to be withdrawn by suitable levers O², or other means.

On the top of the beam K carrying the raking fingers J are secured brackets K², pivotally connected by links P, with the ends of the U-shaped arm P', mounted to turn at its middle part in suitable bearings formed on the under side of the cross beam A³ of the main frame A. One of the ends of this arm P' is pivotally connected to a rod P², extending along the outside of a side beam A', the outer end of the said rod being turned into a handle P³, adapted to be seized by the operator standing on the wagon N. Rack teeth P⁴, are formed near the upper end of the rod P², and are adapted to engage a lug or staple P⁵, secured to the respective side beam A' and serving to lock the said rod P² in the desired position. By the operator pulling on the handle P³, the U-shaped arm P' is swung, by its connection with the links P, and the beam K is turned in its bearings so as to swing the rake fingers toward or from the ground according to the obstruction in the path of the machine. The links P above mentioned pass through the forked upper ends of the shifting levers E' and each is provided near its rear end with a bend P⁶, adapted to engage the fork in the respective shifting lever E', when the operator pulls the handle P³ into the outermost position to raise the rake fingers into their uppermost position, when transporting the machine from one place to another. The bends P⁶ in the links P in pressing against the forked ends of the shifting levers E', actuate the latter and thereby throw the pinions D out of mesh with the internal gear wheels C, thus stopping the motion of crank shaft F, and consequently that of the elevator arms G.

Above the tops of the elevator arms G is arranged a light slatted frame Q, the lower end of which rests on the rake finger beam K and is provided at or near its middle with a transverse bar Q', held vertically adjustable in brackets Q², extending from the side beams A' of the main frame A. The frame Q holds the hay on top of the elevator arms G and prevents the hay from being blown off of the machine at the time it is passing up the elevator to the wagon N.

The operation is as follows: The combined rake and loader is pulled forward by the wagon N, on which stands the operator taking hold of the hay as it is delivered by the upper ends of the elevator arms, so as to place the hay in the proper position on the wagon. As the load rises on the wagon N, the operator, by moving the main frame A upward at its outer end, swings the same into a more inclined position so that the hay is always delivered at the proper height. When the machine moves forward the wheels E, by means of the gear wheels C and D, impart a rotary motion to the crank shaft F, which, by its crank arms, swings the elevator arms G, so that their lower ends pass between the rake fingers J, thus taking the hay gathered by the said rake fingers off of the latter and moving it upward, as previously described, the adjacent elevator arms moving in opposite directions.

Having thus described my invention, I claim as new and desire to secure by Letters Patent—

1. The combination with the frame, its drive wheels having gears, the elevating mechanism provided with an operating shaft having loose gears on its ends meshing into the drive wheel gears, clutches for connecting the two sets of gears, and operating levers for the clutches provided with forked upper ends, of the vertically swinging rake, the transverse shaft mounted on the frame and having its ends bent or cranked, links connecting said ends with the rake to raise and lower it, and bent as at P⁶ to engage the forked ends of the clutch levers, and the rod P² connected to the said shaft for rocking it, substantially as set forth.

2. A hay loading apparatus consisting in main frame provided with drive wheels having gears, a transverse crank shaft F mounted on the frame and carrying loose gears meshing with the drive wheel gears, clutches for said loose gears provided with laterally swinging operating levers, the elevator bars having a pivotal sliding connection with the upper end of the frame and connected near their lower downward curved ends with the crank shaft, plates A⁵ filling the spaces between the elevator bars, the yoke like draft bar L pivoted near its rear ends at E² to the sides of the frame and having rearwardly extending pivoted vertically swinging bars K', a pawl and ratchet mechanism connecting the bar L with the frame to adjust its angle, a rake carried by the bars K', a transverse shaft P' mounted on the frame and having its ends cranked, links connecting said ends with the rake and constructed to operate the clutch levers, the rod P² connected to shaft P' and having an adjusting mechanism P⁴ P⁵ at the upper end of the frame, substantially as set forth.

JESSE S. BYERS.

Witnesses:
 M. CARL SMITH,
 FLOYD C. LANDER.